Patented Jan. 25, 1927.

1,615,277

UNITED STATES PATENT OFFICE.

ADOLPH G. HUPFEL, JR., OF NEW YORK, N. Y.

OINTMENT.

No Drawing.  Application filed December 2, 1924.  Serial No. 753,418.

This invention relates to certain improvements in ointment for use in treating open cuts, abrasions, burns and like injuries.

It is a special object of the invention to produce an ointment which is non-poisonous and which shall have great healing properties when applied to bodily injuries, such as cuts, abrasions, sores, burns or the like, and which will reduce or prevent inflammation from such causes.

It is a further object of the invention to produce such an ointment which will be readily absorbed by the skin and will have a softening effect on the parts to which it is applied.

With these and other objects not specifically referred to, the invention consists in a novel compound or mixture of ingredients which will now be fully described and the novel features pointed out in the claims hereunto annexed.

I have discovered that an ointment of ferroso-ferric phosphate when mixed with a suitable greasy carrier or body, and preferably a hardening agent, has a remarkable curative effect when applied to bodily injuries such as above referred to.

In producing this ointment I may proceed as follows: I make a mixture of 1 part ferroso-ferric phosphate, 8 parts of good petroleum jelly, and about 1 part of a suitable hardening agent, such as beeswax. To this mixture may be added, if desired, any suitable perfume, such as oil of geranium, to give the ointment a pleasing odor. The proportions above given I found to have satisfactory effects in practice, but broadly considered the invention is not restricted to these exact proportions, as they may be varied as may be necessary or required for different uses of the ointment.

The ferroso-ferric phosphate is preferably very pure. A convenient way of making a sufficiently pure phosphate is to separately dissolve sodium phosphate and ferrous sulphate in distilled water, in suitable proportions, to effect a reaction, these salts being mixed to produce ferroso-ferric phosphate, which is in the form of a gelatinous precipitate. This precipitate is filtered off and washed to remove any sodium phosphate, ferrous sulphate or free acid, and is preferably dried and powdered.

The greasy carrier or body is, as above stated, preferably a good grade of petroleum jelly and, so that the ointment will have a good body and will not soften too much under ordinary heat conditions, the petroleum jelly used has a fairly high melting point, as, for instance, about 115° C.

In compounding the ointment, the petroleum jelly is melted, and about 1 part of white beeswax is added to this melted mixture; the powdered ferroso-ferric phosphate is mixed with the jelly and wax, and is cooled. During the cooling operation the mixture is stirred or agitated to prevent precipitation of the phosphate. This method is a satisfactory one, but good results may be obtained by adding the washed ferroso-ferric phosphate in its gelatinous form.

The resultant mixture is of a convenient and pleasing character to use, and very efficacious in reducing and curing inflammation and open wounds.

While the ointment and method of making it is that preferred, it will be understood that certain variations may be made in the mixture, as to the hardener, the carrier and the proportions, without departing from the invention.

What I claim is:

1. A stable ointment comprising ferroso-ferric phosphate, a greasy carrier therefor, and a hardening agent.

2. A stable ointment comprising ferroso-ferric phosphate, petroleum jelly, and a hardening agent.

3. A stable ointment comprising ferroso-ferric phosphate, petroleum jelly, and beeswax.

4. A stable ointment comprising precipitated ferroso-ferric phosphate, petroleum jelly having a melting point of about 115° C., and beeswax.

5. A stable ointment comprising 1 part dried powdered ferroso-ferric phosphate, 8 parts petroleum jelly, and 1 part or less of beeswax.

In testimony whereof, I have hereunto set my hand.

ADOLPH G. HUPFEL, JR.